Sept. 10, 1929.  G. D'SCOTT  1,728,139
VEHICLE WHEEL
Filed Sept. 26, 1927  2 Sheets-Sheet 2
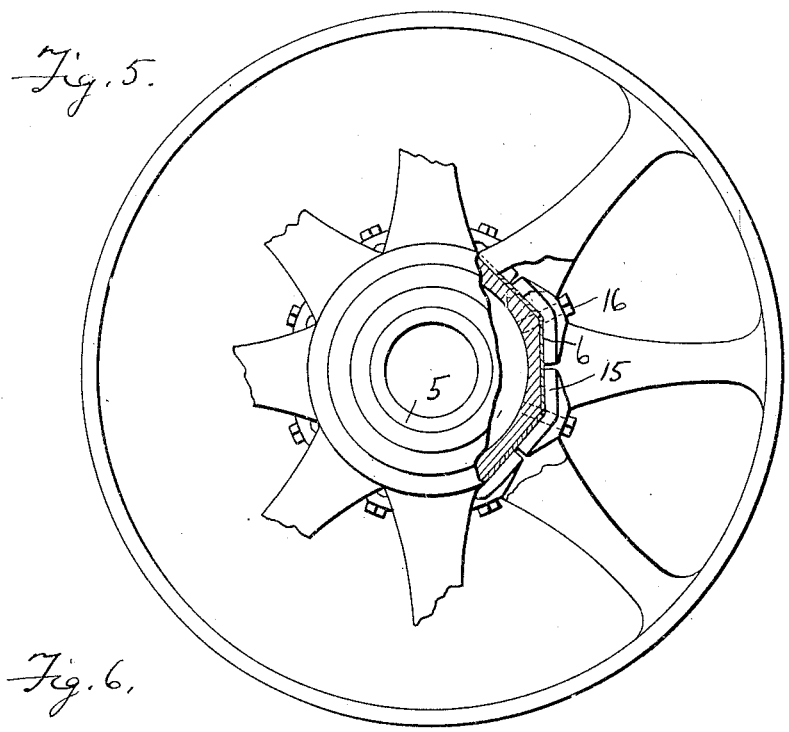
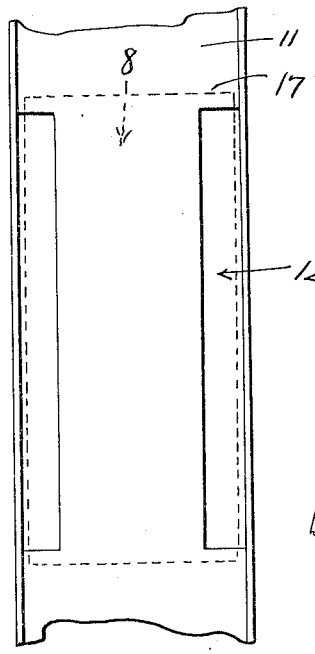
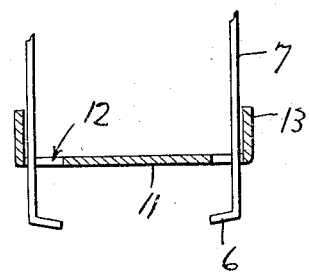
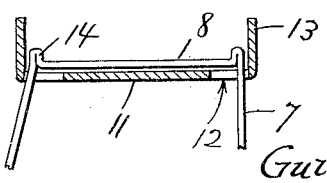
Inventor
Guillermo D'Scott
By Clarence A O'Brien
Attorney Patented Sept. 10, 1929.

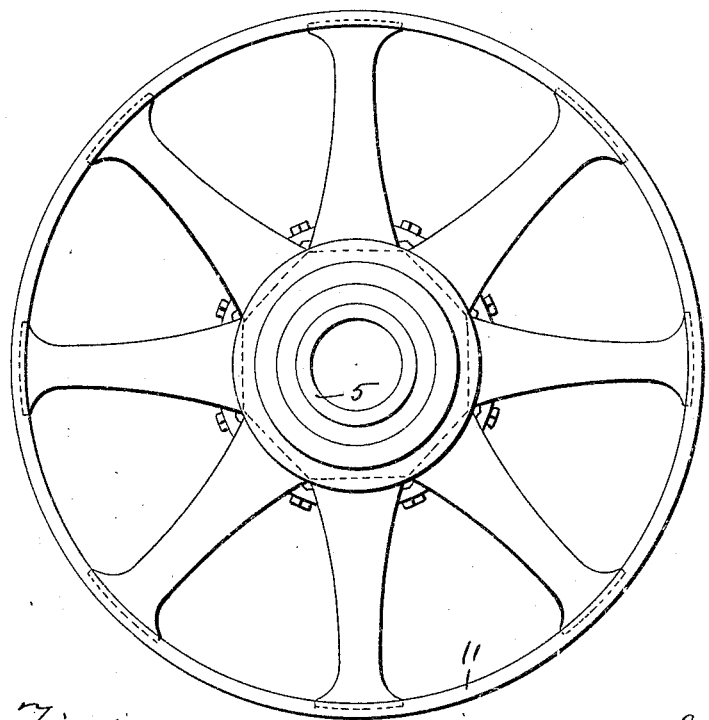
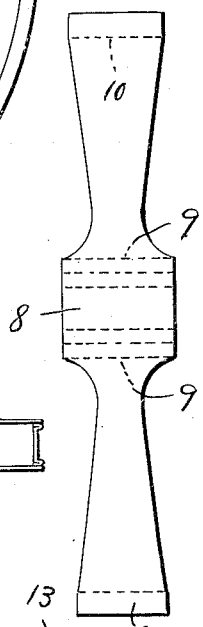
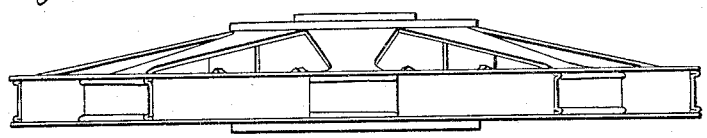
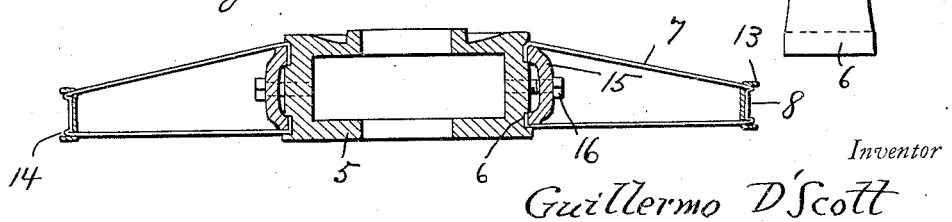

1,728,139

UNITED STATES PATENT OFFICE.

GUILLERMO D'SCOTT, OF HABANA, CUBA.

VEHICLE WHEEL.

Application filed September 26, 1927. Serial No. 222,007.

This invention relates to vehicle wheels and more particularly to wheels of the assembled type in which the various parts of which the wheel is constructed, such as the hub, spokes and rim are separately manufactured and secured in assembled position so as to form the parts into a unit. The invention has for its principal object to arrange the parts in assembled position so that the same may readily be dissembled and replaced when desired.

Another object of the invention is to provide a wheel of this type which is adapted for use upon automobiles either of the pleasure or commercial type and embodying a construction permitting the removal of any one of the spokes thereof should the same become injured or damaged during use, so as to permit the substitution of a new spoke in the place thereof and without necessitating the removal of the remaining spokes forming a part of the wheel.

A further object is to provide a device of this character which is simple and practical in construction, which permits the wheel to be dissembled and packed for shipment in dissembled form in a compact manner, thereby enabling a material saving in the cost of shipment of the wheel, which is arranged for assembling of the parts easily and quickly, which is strong and durable, inexpensive to manufacture, and otherwise well adapted for the purposes for which the same is intended.

Other objects and advantages reside in the special construction and combination of the various elements forming the invention, reference being had to the accompanying drawings forming a part hereof, wherein:—

Figure 1 is a side elevational view of an assembled wheel constructed in accordance with my invention.

Figure 2 is an edge view with one of the spokes removed from the wheel.

Figure 3 is a vertical sectional view through the wheel.

Figure 4 is a plan view of one of the blanks from which the spokes of the wheel are formed.

Figure 5 is an elevational view with parts broken away and shown in section illustrating the manner of securing the spokes to the hub.

Figure 6 is a fragmentary detail of a portion of the wheel rim showing the slots formed therein for receiving the spokes.

Figure 7 is a transverse sectional view through the slotted section of the rim and illustrating the manner in which the ends of the spokes are inserted therethrough, and, Figure 8 is a similar view illustrating the relative position of the rim and spokes when secured thereto.

Referring now to the drawing wherein for the purpose of illustration I have disclosed a preferred embodiment of my invention, I provide a vehicle wheel including a hub 5 having its outer periphery arranged with flattened sides as more clearly illustrated in Figure 5 of the drawing, the number of such flattened sides or surfaces formed about the periphery of the hub depending upon the number of spokes desired to be used in the construction of the wheel. A groove is formed adjacent each edge of the hub, extending along its flattened section and adapted to receive the opposite ends 6 of spokes 7 which as shown in Figure 4 of the drawing is constructed of sheet metal having its spoke members formed by bending the ends of the blanks intermediate the ends thereof at points indicated by the dotted lines 9 whereby to arrange the sides of the spokes 7 in substantially parallel relation. The ends 6 of each side of the spoke are bent at the dotted lines indicated at 10 in a direction towards each other as shown in Figure 3 of the drawing whereby to form a flange along the ends thereof for seating within the groove provided in the hub.

A wheel rim 11 is arranged about the outer ends of the spokes, said rim being provided with slotted openings 12 adjacent the edges thereof adapted to receive the opposite sides 7 of the spoke, with the intermediate section 8 of the spoke blank disposed along the outer periphery of said rim. The edges of the rim are formed with the usual wheel flanges 13.

At the intersection between the side portions 7 of the spokes and the intermediate section 8, the material forming the spoke is crimped to form ribs 14, which as more clearly shown in Figure 8 of the drawing will abut against the flanges 13 of the rim whereby to prevent transverse movement between the rim and the spokes. Likewise, such ribs serve to prevent the bending of the intermediate section 8 of the spoke by reason of the contact between the rib and the flanges 13 of the rim.

The inner ends 6 of the spokes are secured in position within the grooves formed in the hub by means of lugs 15 adapted to be secured to the hub by bolts 16 or the like and arranged with their opposite edges overlapping the adjacent edges of the ends 6 of the spokes as illustrated in Figure 5 of the drawing. In this manner, separate securing lugs for the spokes are provided for engaging the opposite edges of the ends 6 thereof.

The intermediate section 8 of the blank forming the spoke is arranged slightly wider than the side sections 7 thereof as shown in Figure 4 of the drawing, this added width serving to permit said intermediate section to extend beyond the ends of the slotted opening 12 as illustrated in Figure 6 thereby tending to further prevent the buckling or bending of the intermediate section of the spoke, since the edge of said intermediate section indicated at 17 is prevented from sliding through said slots.

It is apparent from the foregoing explanation that the parts from which the wheel is constructed may be separately manufactured and assembled to form the completed wheel. By so doing, considerable economy is provided in arranging the wheel for packing and shipping as the individual parts of the wheel may be packed in a more compact manner than would be possible when packing the assembled wheel. Also should any of the parts comprising the wheel become damaged or otherwise necessitate replacing, such damaged parts may be readily removed and new parts substituted therefor, without affecting the assembled relation of the remaining parts.

It is obvious that the invention is susceptible of various changes in the shape, size and form thereof, without departing from the spirit or scope of the appended claims, and I accordingly claim all such forms of the device to which I am entitled.

I claim:

1. In a wheel structure, the combination of a rim having a plurality of circumferentially slotted openings formed therein and arranged in pairs adjacent the opposite edges of the rim, and a plurality of U-shaped spokes adapted to have their ends inserted in said openings and extending toward the hub of the wheel for attaching thereto, said spokes having their intermediate portions disposed upon the outer surface of the rim, and with the opposite edges of the spoke in overlapping relation with the ends of the opening whereby to limit the inward movement of the ends of the spokes through said opening.

2. In a wheel structure, the combination of a rim having a plurality of circumferentially slotted openings formed therein and arranged in pairs adjacent the opposite edges of the rim, and a plurality of U-shaped spokes adapted to have their ends inserted in said openings and extending toward the hub of the wheel for attaching thereto, said spokes having their intermediate portions disposed upon the outer surface of the rim, and with the opposite edges of the spoke in overlapping relation with the ends of the opening whereby to limit the inward movement of the ends of the spokes through said opening, and a pair of reinforcing ribs formed in the spoke defining the limitations of the sides and the outwardly disposed ends thereof and extending circumferentially of the rim above said opening.

In testimony whereof I affix my signature.

GUILLERMO D'SCOTT.